United States Patent [19]
Meixler

[11] Patent Number: 5,218,346
[45] Date of Patent: Jun. 8, 1993

[54] LOW VOLUME FLOW METER

[75] Inventor: Lewis D. Meixler, East Windsor, N.J.

[73] Assignee: The United States of America as represented by the United States Department of Energy, Washington, D.C.

[21] Appl. No.: 694,176

[22] Filed: May 1, 1991

[51] Int. Cl.$^5$ .............................................. G08B 21/00
[52] U.S. Cl. .................................... 340/606; 340/609; 73/861.77
[58] Field of Search ............... 340/606, 603, 609, 610, 340/616, 527, 529; 73/861.77

[56] References Cited

U.S. PATENT DOCUMENTS

| | | | |
|---|---|---|---|
| 3,792,610 | 2/1974 | Kountanis et al. | 73/861.77 |
| 3,922,525 | 11/1975 | Kozak et al. | 73/861.77 X |
| 4,797,666 | 1/1989 | Baxter et al. | 340/606 |
| 4,851,666 | 7/1989 | Anderson et al. | 73/861.77 X |

Primary Examiner—Jin F. Ng
Assistant Examiner—Jeffrey A. Hofsass
Attorney, Agent, or Firm—Bradley W. Smith; John M. Albrecht; William R. Moser

[57] ABSTRACT

The low flow monitor provides a means for determining if a fluid flow meets a minimum threshold level of flow. The low flow monitor operates with a minimum of intrusion by the flow detection device into the flow. The electrical portion of the monitor is externally located with respect to the fluid stream which allows for repairs to the monitor without disrupting the flow. The electronics provide for the adjustment of the threshold level to meet the required conditions. The apparatus can be modified to provide an upper limit to the flow monitor by providing for a parallel electronic circuit which provides for a bracketing of the desired flow rate.

11 Claims, 6 Drawing Sheets

FLOW MONITOR WITH LOW SPEED THRESHOLD

NORMAL FLOW CASE    PERIOD "P" >0.1 Sec., P ≤ 1.0 Sec.

WATER WHEEL PULSES | 1 Sec. | 2 Sec. | 3 Sec.

M1-Q

M1-Q̄ — 23

M2-Q̄ — 22

M3-Q — 24

M3-Q̄

M4-Q

M4-Q̄

OUTPUT ENABLED – AND OF M1-Q, M2-Q̄, M4-Q

NORMAL FLOW = (M2-Q̄) · (M4-Q)

FIG. 4

LOW VOLUME FLOW METER

CONTRACTUAL ORIGIN OF THE INVENTION

The United States Government has rights in this invention pursuant to Contract No. DE-AC02-76CH03073 between the United States Department of Energy and Princeton University.

BACKGROUND OF THE INVENTION

There is often a need to monitor the flow of liquids or gases when the rate of flow is very low or when the need to detect a flow has added restrictions that limit the degree of interaction between the means for measuring the flow rate and the fluid itself. Typical applications of restrictive flow monitoring environments include chemical processing plants, where the fluids may be highly combustible or corrosive, or in facilities where there is a danger of electrical shock. A further example involves an X-ray laser, where there is a need to measure the flow of the cooling water through a high field pulsed magnet. Under typical conditions the rate of flow of water through the magnet is approximately 0.333 gallons per minute and the magnetic field coils are electrically pulsed to voltages exceeding several thousand volts; these conditions subject the flow monitor to very low rates of flow and a very high electric field.

There are several methods of monitoring fluid flow in a conduit or pipe. One of the methods of determining flow employs a magnetic switch pickup which uses a magnetic washer that is free to move over a short distance under the influence of a pressure differential across the washer. A magnetic reed switch is placed near the material, and when the fluid is flowing and the pressure differential is sufficient to cause the washer to move, the switch is engaged and closes indicating a fluid flow. This method allows for the measurement of flow in an opaque fluid but is usually restricted to high flow rates. Also, since the washer is imbedded in the flow, it provides a constriction to the path of flow and in addition, may prove to be position sensitive.

Another method of measuring flow, which is applicable to low flow rates, involves the use of a thermistor and a heating element. This method places a heating element upstream from a thermistor. The temperature detected by the thermistor is a function of the power supplied to the heating element, the specific heat of the fluid and the flow rate. Thus, knowing the power supplied to the heating element and the specific heat of the fluid, one can calibrate the fluid flow rate. One problem with this method is that both elements, the thermistor and the heating element, invade the flow stream. In addition, this method often encounters calibration problems.

Another method employs the doppler effect. With this method, a sound wave is transmitted into the fluid flow, and the frequency of the returning sound is detected. Movement of the fluid shifts the frequency of the returning sound by adding a component to the frequency. This is a very accurate method of determining flow and can measure very low flows, but it is much more costly than applicant's method or the other methods described. This method may also be susceptible to noise or mechanical vibration.

Applicant's invention involves an apparatus capable of detecting the flow in a fluid stream having a flow rate less than 0.333 gallons per minute. Further, with applicant's apparatus, there is only limited interference with the flow of the fluid stream. The apparatus for monitoring low flow is also capable with a minor modification to bracket a desired flow rate such that the apparatus will monitor a low rate of flow and also monitor if the fluid flow rate exceeds a predetermined upper limit.

Accordingly, it is an object of this invention to provide a means of measuring the existence of a fluid stream having a low volume rate of flow.

It is still a further object of this invention to provide a low flow meter capable of having a variable low flow trip point so that the user can select the low flow "trip" level at which flow will be detected.

It is still a further object of this invention to provide an apparatus with limited interference with the fluid stream.

It is a further object of this invention to provide for modified circuitry which will monitor fluid flow within a set of high-low fluid flow rate conditions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

To achieve the foregoing and other objectives and in accordance with the purposes of the present invention, as embodied and broadly described herein, the present invention provides a means for determining whether the fluid flow rate associated with a fluid stream meets a predetermined low flow rate. The apparatus also possesses a means of varying the threshold at which a flow is monitored. By modifying the circuit, one can bracket the flow so that the user is informed if the flow exceeds a specified upper level or falls below a specified lower level.

BRIEF DESCRIPTION OF THE DRAWINGS

FIG. 4 shows the logic cycling of the multivibrators in response to a low flow situation as depicted by a given set of monitoring conditions and a specific periodic input for the modified circuit.

DETAILED DESCRIPTION OF THE INVENTION

The present invention provides a means for monitoring low volume fluid flows and bracketed flows with limited invasion of the fluid stream by the measuring probe.

Figure 1:
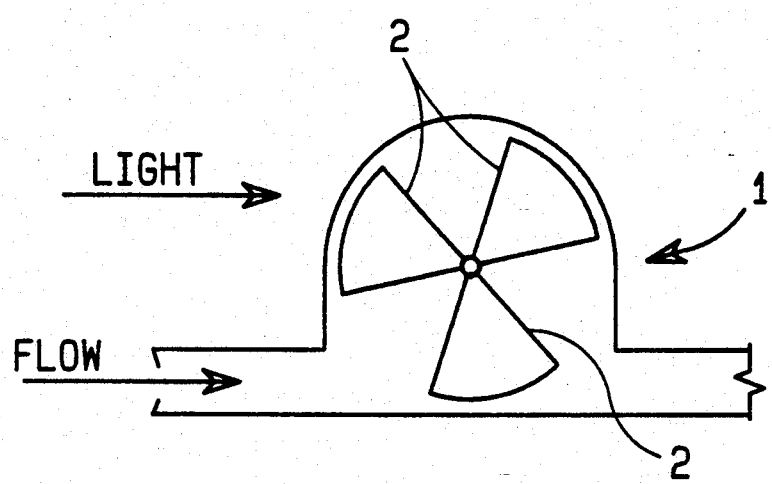
FIG. 1 show the detection portion of the low flow meter.

FIG. 1 depicts the flow detection device, 1. It is essentially a waterwheel type apparatus having a positive rotational displacement relative to the flow of the fluid. For the apparatus currently in use, a Cole-Palmer Co., model N-06297-01 was used. This unit is capable of measuring flows ranging from 5 ml/sec to 95 ml/sec. The detection device, 1, consists of three opaque paddle wheel sections each encompassing sixty degrees of arc, 2, where each of the opaque sections is separated by an empty space encompassing 60 degrees of arc. This provides a high degree of contrast for light transmitted through the device, and thus, allows the flow detection device, 1, to be used with a variety of clear fluids.

Figure 2:
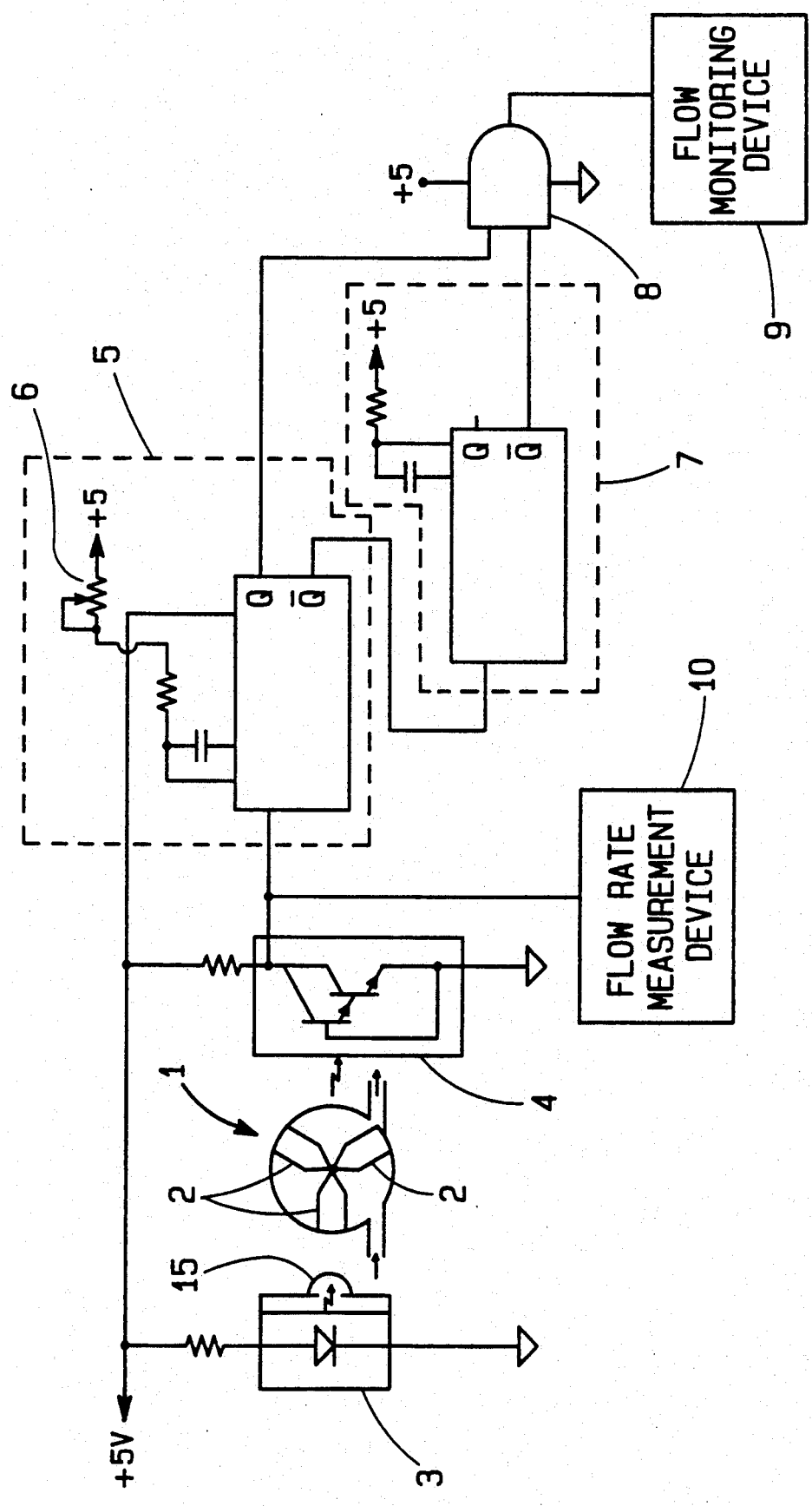
FIG. 2 depicts the low flow apparatus.
Figure 5:
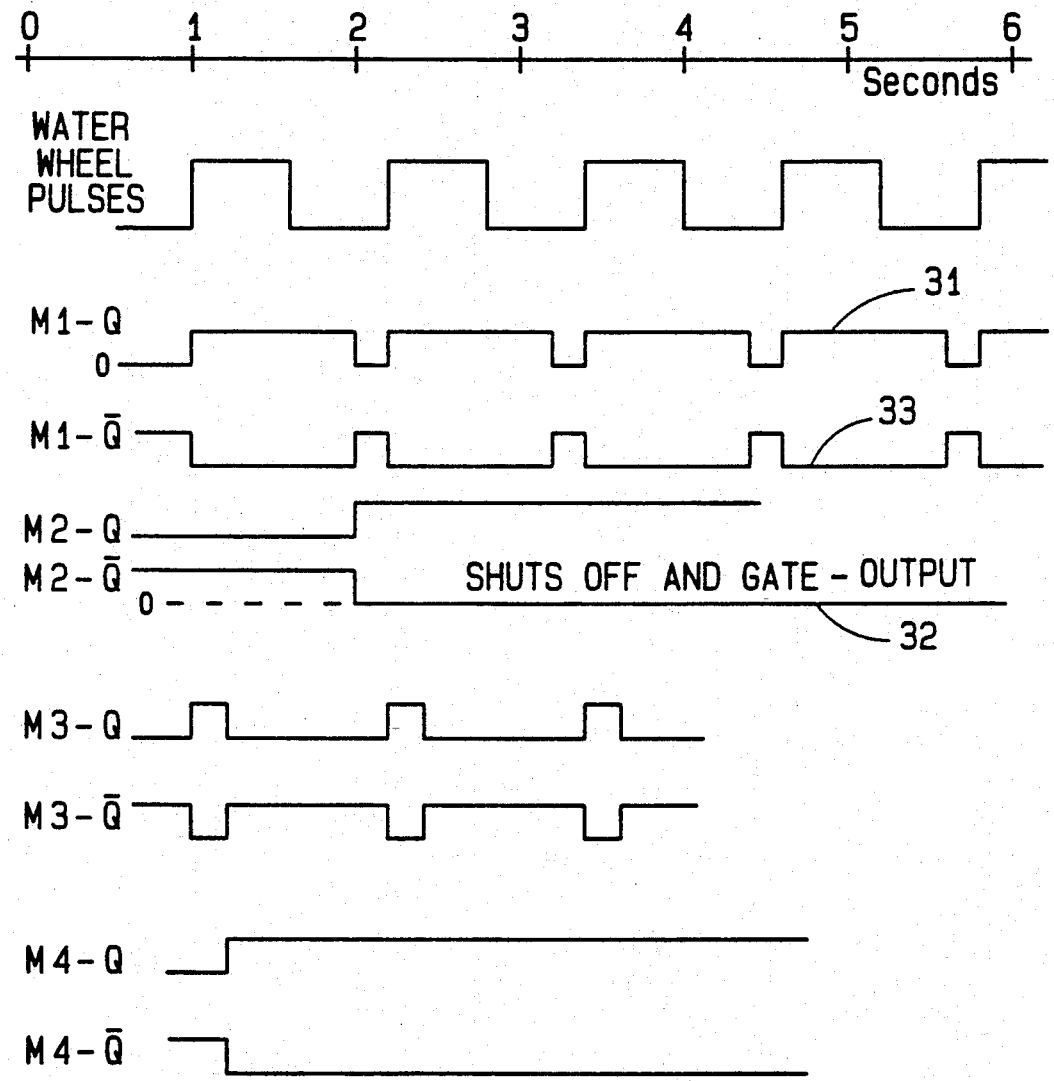
FIG. 5 shows the logic cycling of the multivibrators in response to a normal flow situation as depicted by a given set of monitoring conditions and a specific periodic input for either the low flow circuit or the modified circuit.

FIG. 2 depicts the low flow apparatus which includes the flow detection device, 1, and the instrumentation used to detect the rotation of the paddle wheel sections, 2, within a specified frame of reference. In this apparatus, a light emitting diode (LED), 3, emits an infrared beam which is focused, through the use of an internal integral focussing lens 15, on an area of the flow detection device, 1, which is alternatively occupied by one of the paddle wheel sections, 2, and a clear area during the rotation of the wheel; in constructing the apparatus, a LED55C was employed. A high gain, photo-Darlington detector, 4, is used to sense the portion of the infrared beam transmitted when the infrared beam transcends the clear space between the opaque paddles, 2. All of the components used to construct the device are external to the flow stream and flow detection device, 1. This allows the components to be replaced without disrupting the fluid flow. As the flow detection device, 1, turns, it modulates the infrared beam generated by the LED, 3, at a rate of three cycles for each 360 degree rotation. The rate of modulation is sensed by the photo-Darlington detector, 4, and the pulsed cycle is transmitted to a first retriggerable mono-stable multivibrator system, 5. The period of the first retriggerable mono-stable multivibrator system, 5, is adjusted using the potentiometer, 6, so that its logic output, Q, remains at a logic one as long as the pulse period as detected by the photo-Darlington detector, 4, is shorter than a set drop-out time, FIG. 4, 21; if the pulse period exceeds the drop-out time, the Q output cycles to a logic 0, FIG. 5, 31. Normally, the second retriggerable mono-stable multivibrator system, 7, remains in the Q=0, Q-bar=1 state, FIG. 4, 22. Thus, under normal conditions with the flow above the entered minimum value both multivibrator systems, 5 and 7, would convey a logic 1 to the AND gate, 8, which would respond with a logic 1 to an outside monitoring device, 9. If the pulse rate provided by the photo-Darlington detector, 4, drops to a very low value, such that the output of the first retriggerable mono-stable multivibrator system, 5, is cycling at a low rate, FIG. 5, 31, the second retriggerable mono-stable multivibrator, 7, output goes to a logic 0, FIG. 5, 32, and causes the output of the AND Gate, 8, to go to logic 0 which in turn causes the monitoring device, 9, to detect a low flow. In the circuit shown the retrigger period of the second multivibrator, 7, is set to 10 seconds which is considered to be essentially negligible flow. Zero flow causes the output of the first multivibrator system, 5, to go to logic 0, which causes the output of the AND Gate, 8, again to go to 0 with the monitor device, 9, again reading a low flow rate. In an alternate form, the pulse output from the photo-Darlington detector, 4, can be inputted to an external counting scheme, 10, which can be calibrated to provide a measure of the actual flow rate.

Figure 3:
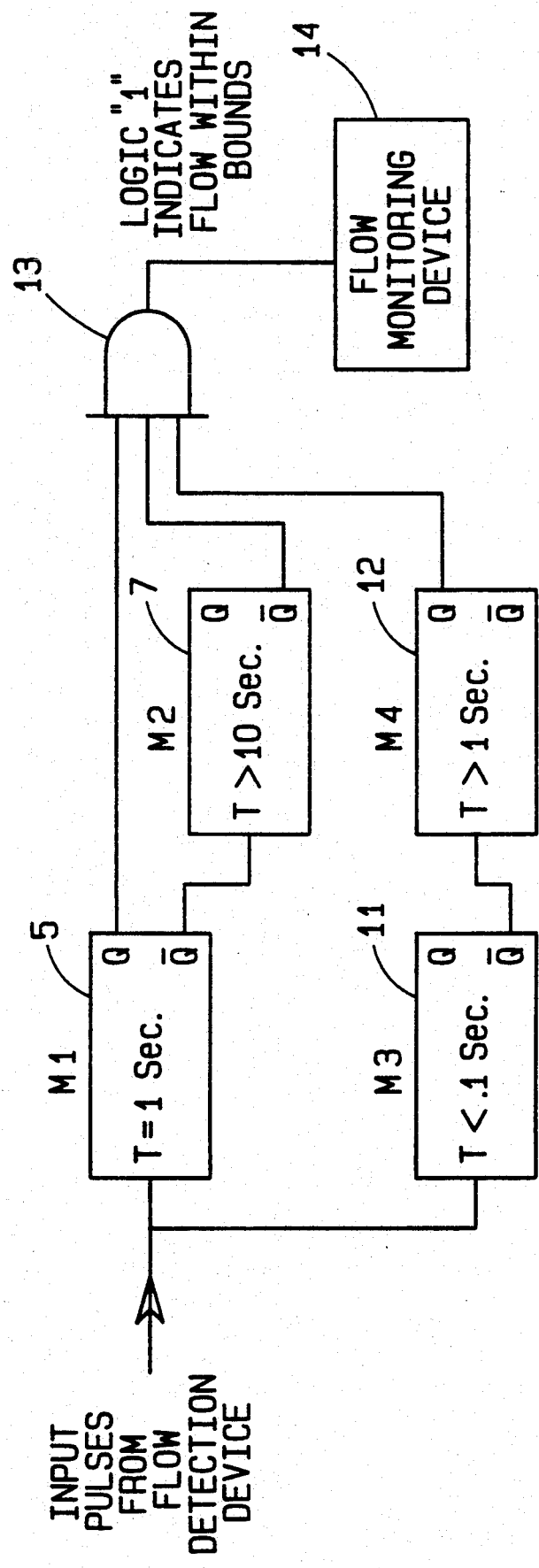
FIG. 3 depicts the electrical schematic parallel alteration for the flow bracketing determination scheme.
Figure 6:
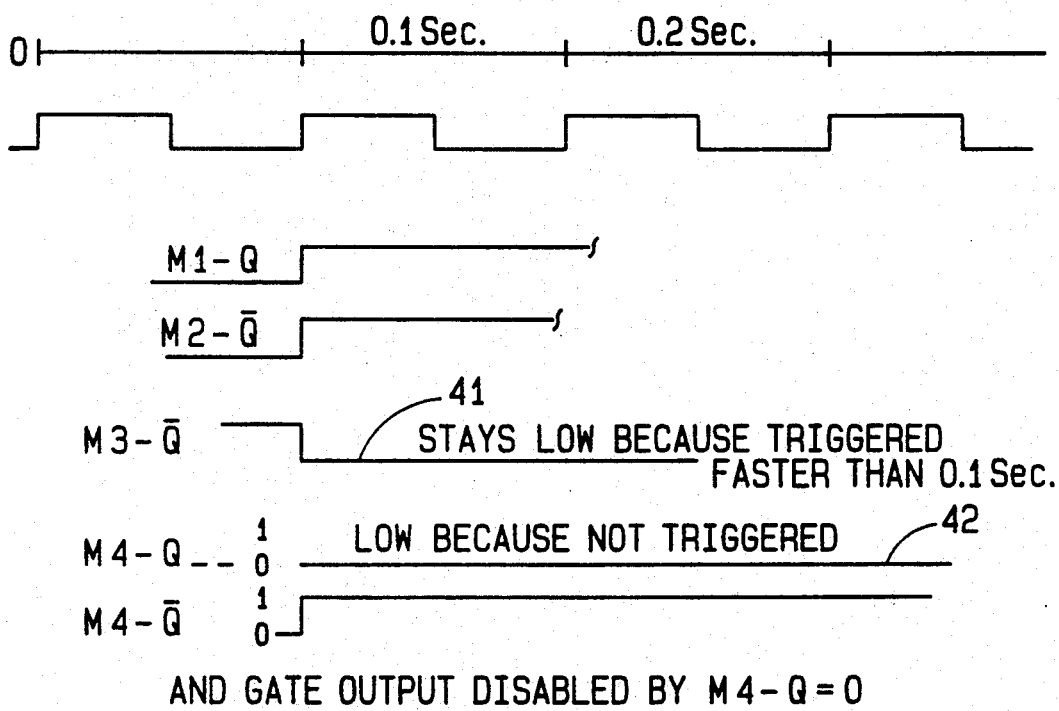
FIG. 6 shows the logic cycling of the multivibrators in response to a high flow situation as depicted by a given set of monitoring conditions and a specific periodic input for the modified circuit.

FIG. 3 depicts a parallel modification to the invention displayed in FIG. 2. The parallel modification yields an apparatus which will detect both a low flow condition and a high flow condition. In FIG. 3, M1, 5, M2, 7, M3, 11, and M4, 12, are all retriggerable mono-stable multivibrator systems. M1, 5, and M2, 7, serve the same functions as the first and second retriggerable mono-stable multivibrator systems, and 7, described in the low flow indicator, FIG. 2, while M3, 11, and M4, 12, represent the third and fourth retriggerable mono-stable multivibrator systems, which serve to detect the high flow case. The period limits for each of the multivibrators can, for example, be set as follows: M1=1 sec, M2=10 sec, M3=0.1 sec, and M4=1 sec. Using these settings, as long as the input frequency pulses to M1, 5, and M3, 11, are between 1 and 10 pps (pulses per second), M1, 5, will remain constantly set at Q=logic 1, and Q-bar=0, FIG. 4, 21 and 23, and the M2, 7, Q-bar output will be logic 1, FIG. 4, 22. M3, 11, will emit pulses at the input rate, FIG. 4, 24, and cause M4, 12, to remain set with Q=logic 1 and Q-bar=logic 0. Therefore, all inputs to the AND Gate, 13, will be at logic 1 and the output from the AND gate will be a logic 1. This will convey an indication of a valid flow rate to the flow monitor, 14. For pulses with a frequency less than 1 pps, M1, 5, FIG. 5, 33, will emit pulses at its output and M2, 7, will set causing its Q-bar output to go to logic 0 blocking the AND Gate, 13, and thus, indicating an invalid flow to the flow monitor, 14. For pulses greater than 10 pps, M3, 11, will remain constantly at a Q-bar output of logic 0 which will cause the trigger input to M4, 12, to cease thereby causing the Q output to go to the logic 0 state after one second, FIG. 6, 41, thus, blocking the AND Gate, 13, yielding a logic 0 from the AND gate, 13 and indicating an invalid flow rate to the flow rate monitor, 14. The status of the multivibrators M2, 7, and M4, 12, for the various flow regimes are indicated below:

Normal flow: M2, 7, Q-bar=1; M4, 12, Q=1
Low flow: M2, 7, Q-bar=0; M4, 12, Q=1
High flow: M2, 7, Q-bar=1; M4, 12, Q=0

The embodiments of the invention in which an exclusive property or privilege is claimed are defined as follows:

1. A system for monitoring the flow rate of a fluid stream to determine if the flow rate meets a predetermined threshold value comprising:
   a light source physically separate from the fluid stream and capable of projecting a focused beam of light through a gaseous and liquid medium;
   a flow detection device optically coupled to said light source where said flow detection device is capable of interrupting transmission of said focused light beam through said flow detection device at a frequency dependent on the flow rate of the fluid stream to create a pulsed light signal having a periodicity based on the flow rate;
   a photodetection device which is optically coupled to said flow detection device and which receives said pulsed light signal and converts it to a pulsed electrical signal having a periodicity dependent on said periodicity of said light signal and where said light source and said photodetection device are external to said flow detection device;
   first retriggerable mono-stable multivibrator system means coupled and responsive to said pulsed electric signal from said photodetection device and capable of a variable logic output where said output is based on the condition of whether or not said periodicity of said pulsed electric signal exceeds a predetermine periodicity for said pulsed electric signal;

second retriggerable mono-stable multivibrator system means responsive to said first multivibrator system means and capable of a variable logic output;

logic means coupled to said first multivibrator means and said second multivibrator means and responsive to a first logic signal from said first multivibrator system means and a simultaneous second logic signal from said second multivibrator system means and capable of outputting a logic function based on said first logic signal and said second logic signal;

flow monitoring means responsive to said logic means and capable of indicating if the rate of flow meets or is below a predetermined threshold value based upon a simultaneous output of said first and second logic signals.

2. The system of claim 1 in which said flow detection device employs a paddle wheel apparatus which is in contact with the fluid stream and whose frequency of rotation is responsive to the flow rate of the fluid stream and whose paddles are opaque to light which results in a modulation of said focused light beam as said light beam alternately strikes an opaque paddle which blocks said light beam from passing through the paddle wheel apparatus and an unobstructed space between said opaque paddles which allows said light beam to pass through said paddle wheel apparatus, thus, producing said pulsed light signal.

3. The system of claim 1 in which said first multivibrator system employs a variable resistive circuit to provide an alterable input limiting value for said multivibrator system so as to allow for a variable logic output based on the relation of said input limiting value to said periodicity of said pulsed electric signal an where said limiting value employed is dependent on a predetermined threshold value for the flow.

4. The system of claim 1 in which said light source is a light emitting diode capable of emitting, through the use of an internal integral focussing lens, said focused beam of light in the infrared spectrum.

5. The system of claim 1 in which said logic means is a logic AND gate.

6. A system for monitoring the flow rate of a fluid stream to determine if the flow rate of the stream meets a predetermined lower limit for the rate of flow and if the flow rate of the stream meets a predetermined upper limit for the rate of flow comprising:

flow rate detection means for detecting a fluid flow and formulating a data stream on the fluid flow in a pulsed format;

first retriggerable mono-stable multivibrator system means coupled to said flow rate detection means and capable of a variable logic output based on a desired threshold value for the flow rate;

second retriggerable mono-stable multivibrator system means responsive to said first multivibrator system means and capable of a variable logic output;

third retriggerable mono-stable multivibrator system means coupled to said flow rate detection means and capable of a variable logic output based on a desired upper limit for the flow rate;

fourth retriggerable mono stable multivibrator system means responsive to said third multivibrator system means and capable of a variable logic output;

logic means responsive to said first multivibrator system means, said second multivibrator system means, and said fourth multivibrator system means and capable of outputting a logic function;

flow monitoring means responsive to said logic means and capable of indicating if the rate of flow satisfies the flow range bracketed by the predetermined limit on the lower rate of flow and the predetermined limit on the upper rate of flow.

7. The system of claim 6 in which said flow rate detection means includes:

a light source capable of transmitting a light beam;

a flow detection device capable of chopping said light beam at a frequency dependent on the flow rate to create a pulsed light signal;

a photodetection device which receives said pulsed light signal and converts it to a pulsed electrical signal.

8. The system of claim 7 in which said flow detection device employs a paddle wheel apparatus which is in contact with the fluid flow and whose frequency of rotation is responsive to the flow rate of the fluid stream and whose paddles are opaque to light.

9. The system of claim 6 in which each of said first and third multivibrator systems each employ a variable resistive circuit to input a first limit value to said first multivibrator system and a second limit value to said second multivibrator system where said first and said second limit values alter a logic response from said first and third multivibrators based on a specific relationship between an input signal to said first and third multivibrators and said first and second limit values.

10. The system of claim 6 in which said light source is a light emitting diode capable of emitting a focused beam of light in the infrared spectrum.

11. The system of claim 6 in which said light source is a light emitting diode capable of emitting, through the use of an internal integral focussing lens, a focused beam of light in the infrared spectrum.

* * * * *